US012675149B2

(12) United States Patent
Vlaiko et al.

(10) Patent No.: US 12,675,149 B2
(45) Date of Patent: Jul. 7, 2026

(54) SSD POWER MANAGEMENT WITH HYBRID PCIe LINK STATE METHOD

(71) Applicant: Sandisk Technologies, Inc., Milpitas, CA (US)

(72) Inventors: Julian Vlaiko, Kfar Saba (IL); Dmitry Vaysman, San Jose, CA (US); Roni Ankonina, Sunnyvale, CA (US); Nissim Elmaleh, Meitar (IL); Judah Gamliel Hahn, Ofra (IL)

(73) Assignee: Sandisk Technologies, Inc., Milpitas, CA (US)

( * ) Notice: Subject to any disclaimer, the term of this patent is extended or adjusted under 35 U.S.C. 154(b) by 181 days.

(21) Appl. No.: 18/588,236

(22) Filed: Feb. 27, 2024

(65) Prior Publication Data

US 2025/0271921 A1 Aug. 28, 2025

(51) Int. Cl.
G06F 1/32 (2019.01)
G06F 1/3234 (2019.01)

(52) U.S. Cl.
CPC .......... G06F 1/3278 (2013.01); G06F 1/3275 (2013.01)

(58) Field of Classification Search
CPC .............................. G06F 1/3278; G06F 1/3275
See application file for complete search history.

(56) References Cited

U.S. PATENT DOCUMENTS

| | | | |
|---|---|---|---|
| 9,229,525 B2 | 1/2016 | Reller et al. | |
| 10,866,625 B2 | 12/2020 | Schneider et al. | |
| 10,895,904 B2 | 1/2021 | Sato | |
| 2004/0215986 A1* | 10/2004 | Shakkarwar | G06F 1/3253 |
| | | | 713/300 |
| 2007/0050653 A1* | 3/2007 | Verdun | G06F 1/3228 |
| | | | 713/320 |
| 2007/0127581 A1 | 6/2007 | Connor et al. | |
| 2019/0050252 A1* | 2/2019 | Arbel | G06F 3/0628 |
| 2019/0087299 A1 | 3/2019 | Yasuda et al. | |
| 2019/0155361 A1* | 5/2019 | Berchanskiy | G06F 1/329 |
| 2019/0250930 A1 | 8/2019 | Erez | |
| 2021/0041929 A1 | 2/2021 | Connor et al. | |
| 2021/0109587 A1 | 4/2021 | Mukker et al. | |
| 2022/0222160 A1* | 7/2022 | Lee | G06F 1/24 |

OTHER PUBLICATIONS

International Search Report and Written Opinion for Application No. PCT/US2025/010810 dated Jun. 9, 2025.

* cited by examiner

*Primary Examiner* — Stefan Stoynov
(74) *Attorney, Agent, or Firm* — Patterson + Sheridan, LLP

(57) ABSTRACT

Instead of the Peripheral Component Interconnect (PCI) Express (PCIe) link speed modulation and the PCIe link power state being utilized separately, the PCIe link speed modulation and PCIe link power state strategies are used in combination. The combination balances between the PCIe front end energy cost, the backend energy cost, and the quality of service (QOS). The performance/power space of the solid state drive (SSD) is mapped to the PCIe link speed modulation and PCIe link power state strategies to configure four distinctive zones, which provide high QoS at high performance points with a graceful performance degradation towards the lower performance points. A power/thermal constrained system dictates a certain performance that the SSD will be able to satisfy optimally by using both methods at different performance points.

12 Claims, 9 Drawing Sheets

200

Modulate link speed between the data storage
device and a host device
702

Alternate power state duty cycle between an
active state and an idle state
704

Adjust the modulating and the alternating to
achieve a predetermined energy usage and
quality of service (QoS)
706

SSD POWER MANAGEMENT WITH HYBRID PCIe LINK STATE METHOD

BACKGROUND OF THE DISCLOSURE

Field of the Disclosure

Embodiments of the present disclosure generally relate to maximizing system efficiency limited by power or thermal constraints.

Description of the Related Art

Solid State Drives (SSDs) typically implement power management strategies such as Peripheral Component Interconnect (PCI) Express (PCIe) link speed modulation and PCIe link power state management. In PCIe link speed modulation, the link speed is varied to match the power/performance requirements of the SSD device and the host device. However, the shifting between the PCIe link speeds incurs a latency and a transitional energy cost, and also drives the backend to run at a lower performance than the maximum speed.

The PCIe link speed modulation scheme does not allow the back end to enter into an idle state. In the case of PCIe link power state management, the PCIe link is alternated between an active state L0 and an idle state L1.x. The shifting between PCIe power states enables the backend to go into the idle state. However, the shifting between the PCIe link power states also incurs a latency and a transitional energy cost, and this strategy has a lower quality of service (QOS).

There is a need in the art for improving SSD power management, utilizing PCIe link speed modulation and PCIe link power state at the same time.

SUMMARY OF THE DISCLOSURE

Instead of the Peripheral Component Interconnect (PCI) Express (PCIe) link speed modulation and the PCIe link power state being utilized separately, the PCIe link speed modulation and PCIe link power state strategies are used in combination. The combination balances between the PCIe front end energy cost, the backend energy cost, and the quality of service (QOS). The performance/power space of the solid state drive (SSD) is mapped to the PCIe link speed modulation and PCIe link power state strategies to configure four distinctive zones, which provide high QoS at high performance points with a graceful performance degradation towards the lower performance points. A power/thermal constrained system dictates a certain performance that the SSD will be able to satisfy optimally by using both methods at different performance points.

In one embodiment, a data storage device comprises: a memory device, and a controller coupled to the memory device, wherein the memory device is configured to: modulate link speed between the data storage device and a host device; alternate power state duty cycle between an active state and an idle state; and adjusting the modulating and the alternating to achieve a predetermined energy usage and quality of service (Qos).

In another embodiment, a data storage device comprises: a memory device; and a controller coupled to the memory device, wherein the memory device is configured to: calculate a system average power budget; calculate a link speed in a link speed module; calculate a duty cycle between an active state and an idle state in an energy management duty cycle driver; and set energy budget for data storage device.

In another embodiment, a data storage device comprises: means to store data; and a controller coupled to the means to store data, wherein the controller is configured to: allocate energy budget for elements of the data storage device; receive host device set parameters; receive means to store data internal parameters; detect changes in operating conditions; vary link speed based upon the host device set parameters and the means to store data internal parameters; and vary power state based upon the host device set parameters and the means to store data internal parameters.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of the Peripheral Component Interconnect (PCI) Express (PCIe) link speed modulation and the PCIe link power state being utilized separately, the PCIe link speed modulation and PCIe link power state strategies are used in combination. The combination balances between the PCIe front end energy cost, the backend energy cost, and the quality of service (QOS). The performance/power space of the solid state drive (SSD) is mapped to the PCIe link speed modulation and PCIe link power state strategies to configure four distinctive zones, which provide high QoS at high performance points with a graceful performance degradation towards the lower performance points. A power/thermal constrained system dictates a certain performance that the SSD will be able to satisfy optimally by using both methods at different performance points.

Figure 1:
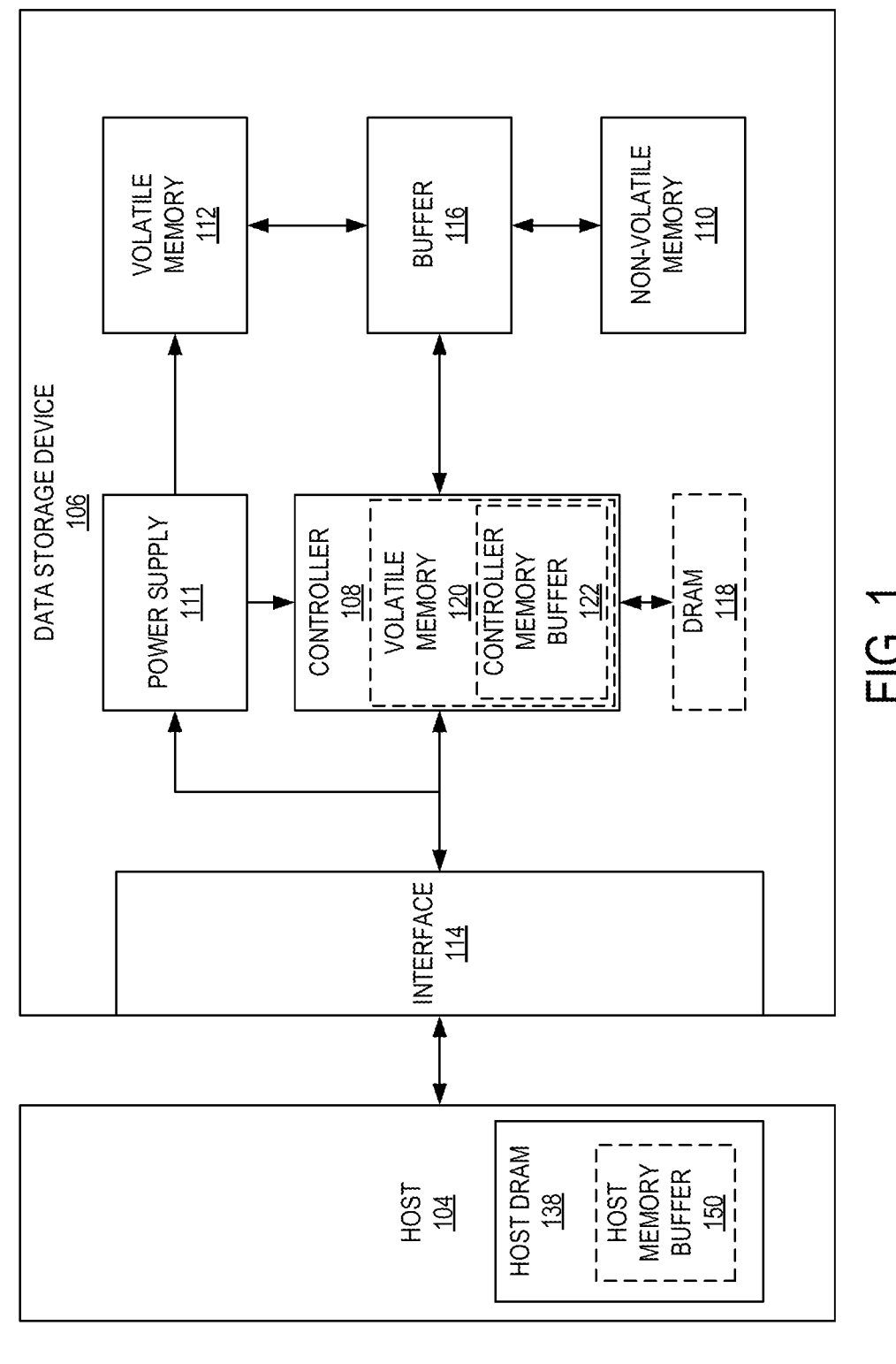
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. It is contemplated that the volatile memory 112 and the DRAM 118 may, in some embodiments, be one in the same. However, it is contemplated that the volatile memory 112 and the DRAM 118 may in fact be different volatile memories with the DRAM 118 being a specific type of volatile memory. As will be discussed below, a second volatile memory 120, which may be SRAM, could also be one in the same with the write buffer 116. However, it is contemplated that there could be distinct DRAM, SRAM, and write buffer. In other words, it is contemplated that there may be multiple distinct volatile memories. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: PCIe, non-volatile memory express (NVMe), OpenCAPI, GenZ, Cache Coherent Interface Accelerator (CCIX), Open Channel SSD (OCSSD), Compute Express Link (CXL), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
FIG. 2 is an illustration of a link state flow diagram, according to certain embodiments.

FIG. 2 is an illustration of a link state flow diagram 200, according to certain embodiments. Aspects of the storage system 100 may be referenced in the description herein for exemplary purposes. The data storage device 106 includes several link states. For example, the data storage device 106 may have the following 5 link states: L0, L0s, L1, L2, and L3, where L1 includes a L1.1 sub-state and a L1.2 sub-state. Each of the link states are associated with a distinct operation of the data storage device 106. Link states L0, L0s, and L1 are considered operational link states and utilize a first range of power, whereas link states L2 and L3 are considered non-operational link states, utilizing a second range of power, where the first range of power is greater than the second range of power.

An operational link state refers to the ability of the host device 104 to communicate with the NVM 110 of the data storage device 106. A non-operational link state refers to the inability of the host device 104 to communicate with the NVM 110 of the data storage device 106 due to a shut down or disconnection of a link between the host device 104 and the controller 108. The listed non-operational link states are not intended to be limiting and may include other link states, such as the L1.1 and L1.2 link states. Furthermore, it is contemplated that more or less link states than the number of link states shown in the link state flow diagram 200 may be available and more or less low power link states may be applicable to the embodiments described herein.

Link states are numbered sequentially, where higher numbers represent lower power requirements due to a greater number of offline circuits and corresponding higher exit latencies. The relevant link states are L0, L0s, L1, and L1.2. L2 and L3 are functionally identical except that Vaux is available in L2. Both have main power rails disabled and the controller 108 is fully powered off (except for whatever may be powered by Vaux). Client SSDs (which use aggressive link power management) do not support Vaux, so L3 is the same as L2. Furthermore, each link state has an associated power requirement and an exit latency. L0 and L0s may require 4.5 W with the lowest exit latency. L1 may require less power than L0, such as 3 W, and may have an exit latency equal to or higher than the exit latency of L0. L2 may require less power than L1 and may have an exit latency equal to or higher than the exit latency of L1. L3 may require less power than L2 and may have an exit latency equal to or higher than the exit latency of L2. The values for the link states and exit latencies are not intended to be limiting, but to provide an example of possible embodiments.

L0 is referred to as a fully operational state, where I/O commands are enabled, and the device may generate interrupts. L0 is a link state where the link is operating normally. Interrupts are an automatic transfer of firmware execution due to a system timer or a user command. Link states L0s and L1 are also operational states; however, Los and L1 may have a lower functionality than that of L0. For example, L0s has a similar power requirement as that of the L0, but only allows for a serial link in one direction. In the L0s link state, data may be transferred in one direction, but not the other. Thus, when a first device is coupled to a second device through a link, the first device may idle a transmitter of the first device independently and separately of the second device idling a transmitter of the second device, and/or vice-versa.

However, L1 allows for a bidirectional serial link and allows for a greater reduction in the power requirement, but has a higher exit latency than that of L0 and L0s. In the L1 link state, no data is being transferred so key portions of the PCIe transceiver logic may be turned off. Link states L2 and L3 are non-operational link states have a power requirement less than that of the operational link states. The difference between the L2 link state and the L3 link state is that auxiliary power has not been yet removed from the L2 link state. Furthermore, the memory devices of the NVM 110 that are not used are placed in a non-operational link state, L2 and L3, to limit the idle power consumption to a minimal value.

In order for I/O commands to occur, the link, such as a data bus, between the host device 104 and the controller 108 is woken up and placed into the L0 link state. The most common state for idle is L1.2. The controller 108 changes the link state of the link between the host device 104 and the controller 108 from the operational link states, such as L0, L0s, or L1, to a different operational link state, such as L0, L0s, or L1, or to a non-operational link state, such as L2 or L3, depending on the situation. However, in order for the link to be placed into L2 or L3, the link will need to be in link state L2/L3 ready, which is a pseudo-state to prepare the component for a loss in power and reference clock(s). The controller 108 allocates the appropriate amount of power to return all link states L0s, L1, L2, L3 into link state L0 when a full operational state is required. For example, to return to L0 from L2 or L3, the link transitions to a transient pseudo-state, LDn, before transitioning to L0. The LDn state may be a fundamental reset state, a hot reset state, or a link disable transmission state by the upstream component (e.g., the host device 104).

The link state L1, in some embodiments, includes additional sub-states, L1.1 and L1.2, where the link state L1 may be referred to as L1.0. The L1 sub-states (L1SS), L1.1 and L1.2, may require more power for operation than L2 and L3; however, the L1SS utilizes less power than the L1.0 state. At an L1SS, the link remains operational and requires less power to return to a more operational state, such as L1.0 or L0. Furthermore, the L1SS requires less time than the L2 and/or the L3 link states to return to a full active link state L0. It is to be understood that "link state" may be referred to as "power state" herein for exemplary purposes.

As discussed herein, the embodiments involve a hybrid approach to SSD power management, utilizing PCIe link speed modulation and PCIe link power state at the same time. In operation, a SSD controller and product contains two main blocks: A Front End consisting of the main PCIe interface with the Host; and a Back End consisting of CPUs, computational data-path (LDPC & security codecs) and a NAND NVM memory storage subsystem comprised of NAND dice modules. The hybrid approach maximizes system efficiency limited by power and/or thermal constraints by combining two main strategies.

The first strategy is PCIe link speed modulation. System performance is driven by the effective bandwidth consumed by the Host, the PCIe link speed modulation is driven by the SSD device in order to match the SSD device and Host power/performance requirements by driving a varying link speed, whether a dynamic duty cycle alternation between link speeds or a slow shift to a link speed that persists for a long period of time without duty cycling. Shifting between PCIe link speeds bears a latency and transitional energy cost. The total cost depends on the current Link speed and Target link speed. Shifting between PCIe link speeds is driving the back end to run at lower performance than maximum speed. By using this method the back end does not have the opportunity of going into idle state and therefore losing opportunities to save power.

The second strategy is PCIe link power state duty cycle. Another way to drive a variable bandwidth consumed by the Host is to alternate the PCIe link between an active state L0 and an idle state L1.x. Shifting between PCIe link power states bears also a latency and transitional energy cost. Total cost depends on the link speed and target L1.x substate (L1.0, L1.1 or L1.2). This method is considered to have a lower QoS (quality of service) figure compared to PCIe link modulation (1) given the fact that host commands latency will increase due to the fact that the device spends time in idle state L1.x. Shifting between PCIe power states to L1.x is enabling the back end to go into idle state as well, essentially enabling the entire system to spend a certain duration in idle state optimized by the system to draw a minimum amount of power.

Link speed modulation dropping from Gen5 to Gen4 reduces the effective PCIe bandwidth by 50%. The same effect of 50% performance drop can also be achieved by a 50% duty cycle of the PCIe link running between L0 and L1.x power states. Both methods yield a similar outcome in terms of average performance yet they display a different system energy cost and a different command latency QoS (quality of service).

The hybrid method described herein is using both strategies described above, balancing between PCIe front end energy cost, back end energy cost and quality of service. A power/thermal constrained system dictates a certain performance that the SSD device will be able to satisfy in an optimal fashion by using both methods at different performance points.

Figure 3:
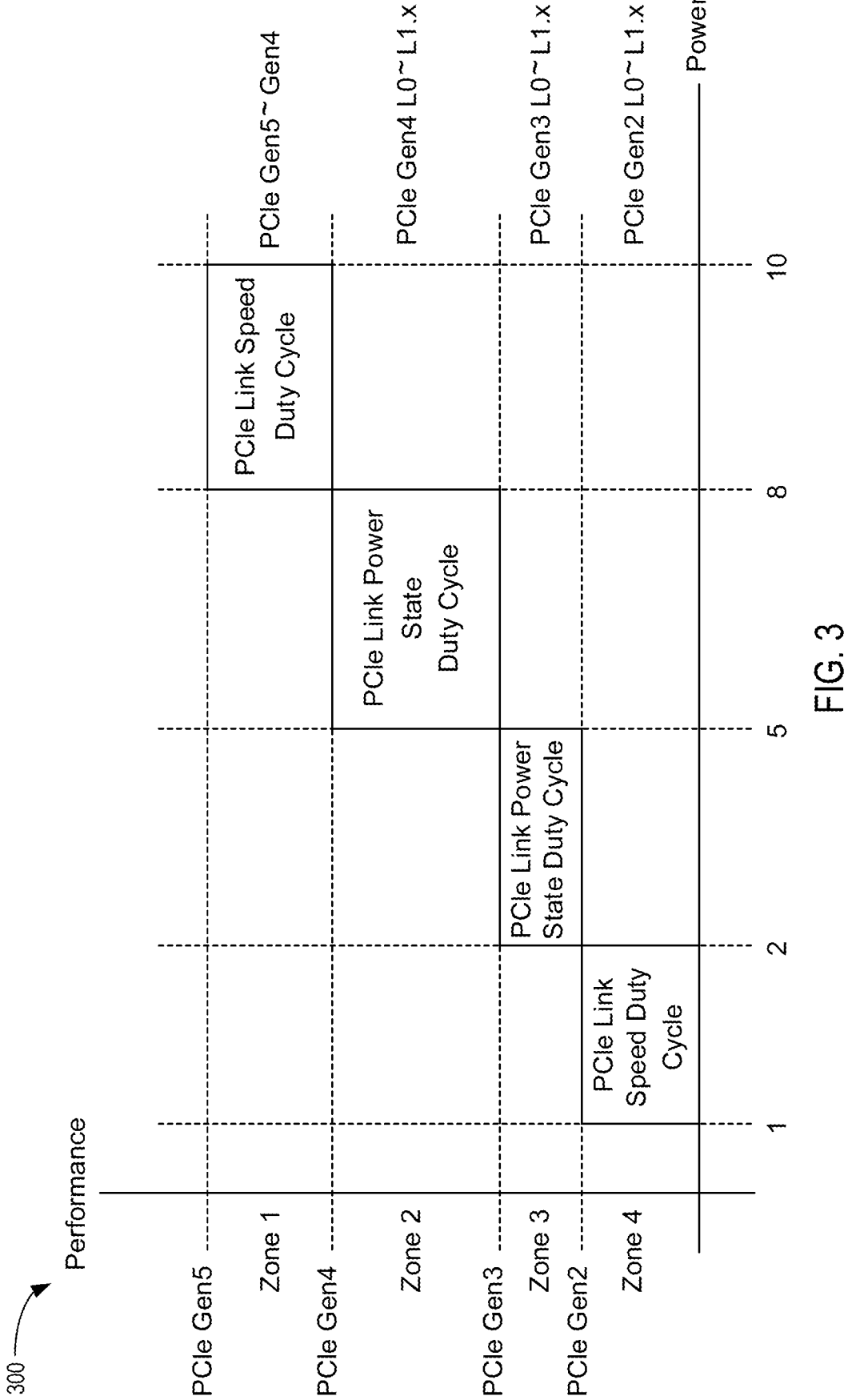
FIG. 3 is a block diagram illustrating a system for performance space mapping, according to certain embodiments.

FIG. 3 is a block diagram illustrating a system 300 for performance space mapping, according to certain embodiments. The performance space is mapped to the two different strategies with 4 distinctive zones, providing a high QoS at high performance points with a graceful performance degradation towards the lower performance points. For Zone 1, the power/performance is modulated by alternating between PCIe Gen5 and PCIe Gen4 at a certain rate matching the power constraint 8-10. For Zone 2, the power/performance is modulated by alternating between L0 and L1.x while in PCIe Gen4 a certain rate matching the power constraint 5-8. For Zone 3, the power/performance is modulated by alternating between L0 and L1.x while in PCIe Gen3 a certain rate matching the power constraint 2-5. Note that Zone 3 uses a PCIe link speed reduction versus Zone 2, essentially utilizing both link speed modulation, albeit at a slow pace, and link power state modulation. For Zone 4, the power/performance is modulated by alternating between PCIe Gen5 and PCIe Gen4 at a certain rate matching the power constraint 1-2.

Figure 4:
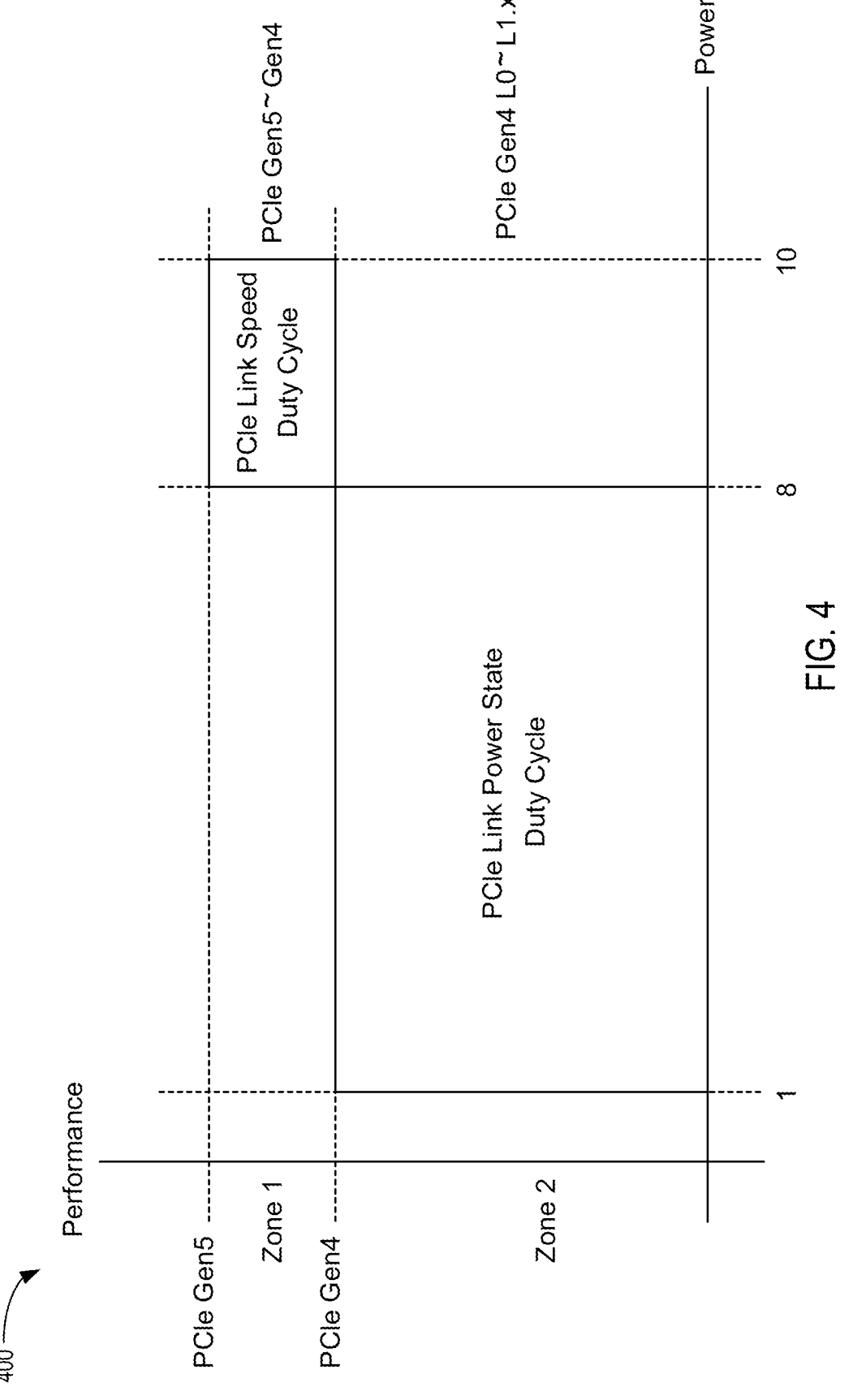
FIG. 4 is a block diagram illustrating a system for an autonomous management by the SSD client device of the PCIe link speed and PCIe link power state, according to certain embodiments.

FIG. 4 is a block diagram illustrating a system 400 for an autonomous management by the SSD client device of the PCIe link speed and PCIe link power state, according to certain embodiments. FIG. 4 shows a simpler case where the performance space is mapped only into two zones that utilize both strategies. In this case PCIe, Gen4 is deemed to be most efficient overall considering both the front end and the back end of the SSD, lower PCIe Gen speeds deemed less efficient hence the omission.

The autonomous management is targeted to satisfy the most efficient energy transfer per host data operation. Implementing varying operating conditions using multiple parameters such as host set parameters, conveyed to the SSD device via standard or non-standard interfaces. Additional operating conditions include maximum power level, thermal throttling levels, QoS levels optimized for different states of the target system, and latency requirements. Examples of QoS levels are high power and performance mode, balanced power and performance mode, and low battery mode.

The system 400 further includes SSD internal parameters. The SSD internal parameters include thermal state, performance state, power state, and predicted state. The thermal state collects internal and external sensors for the controller, NAND, PCB, and PMIC. The performance state monitors effective read/write payload bandwidth by host, queue depth, pending command types and expected payload, background operations, garbage collection, and actual (negotiated with Host Root Complex) PCIe link speed and link power state. The monitored power state includes CPU and data-path clock rates, active state or idle state of SSD controller, and voltage levels for dynamic scaling. The predicted state monitors next cycle period state of operation for the SSD to satisfy an optimized energy function. The set of parameters that will change in the next state.

Figure 5:
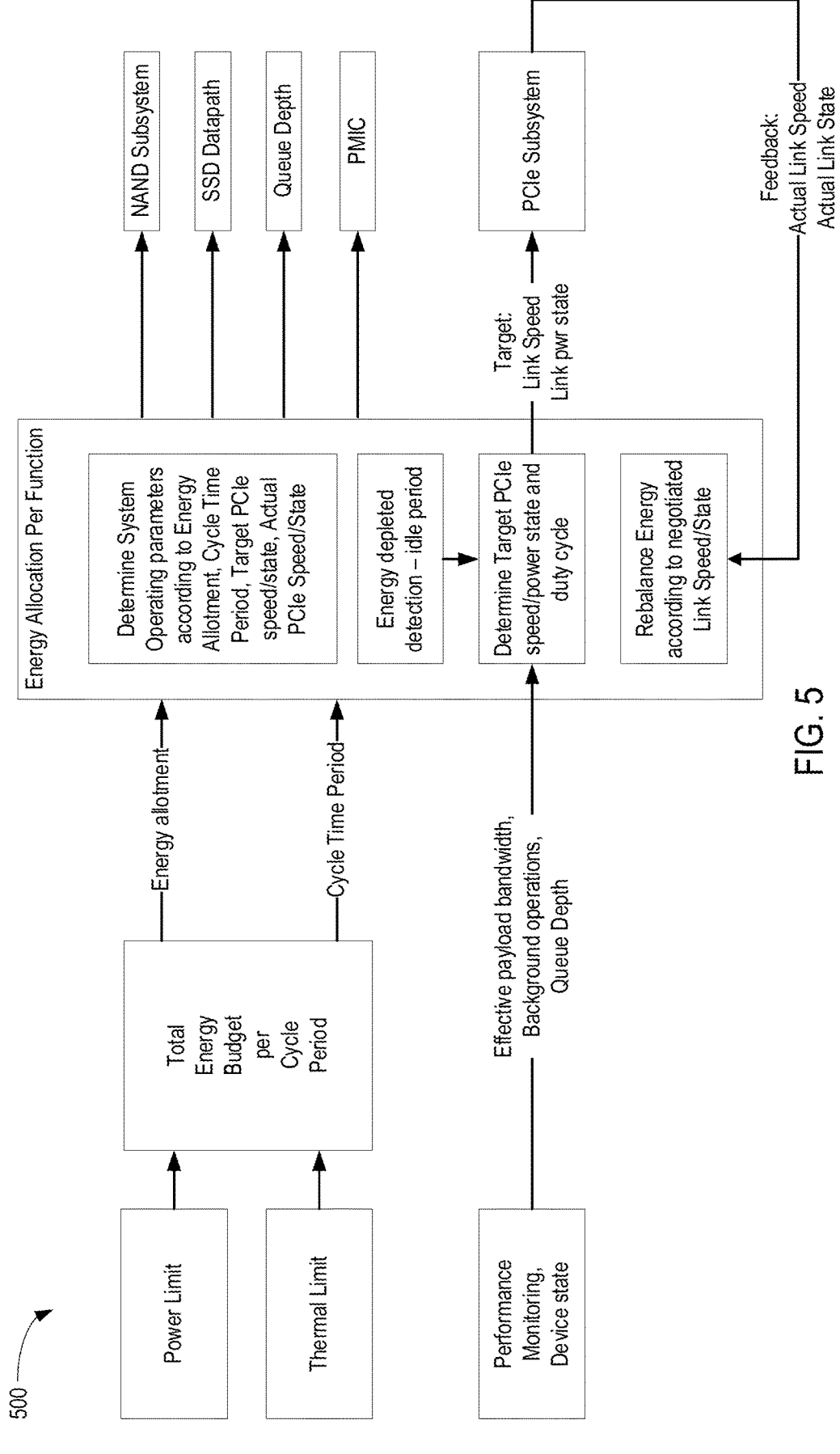
FIG. 5 is a block diagram illustrating a system for hybrid SSD power management, according to certain embodiments.

FIG. 5 is a block diagram illustrating a system 500 for hybrid SSD power management, according to certain embodiments. The system 500 drives an energy allocation per function manager that controls and tracks the power state per each unit. The energy allocation per function determines system operating parameters according to energy allotment, cycle time period, target PCIe speed/state, actual PCIe speed/state. Special attention is given to the PCIe link state, speed and power state. The system 500 may attempt to modify the link speed given a change in the workload or energy allotment, the host may or may not comply. In case the host does not comply with the target PCIe link speed/state, the system 500 will rebalance the energy allocation to other units to comply with the allotted budget. In cases where the host is back pressuring the SSD device by lower PCIe link speed, the energy rebalancer will attempt to optimize efficiency and eventually under-utilize the allotted energy.

The system 500 operates on a power limit that derives the max power that the SSD drive may consume given a parameter provided by the host. An example NVMe power state is autonomous power state transition (APST). The thermal limit derives from two main parameters: Host setting of thermal thresholds, for example NVMe HCTM; and the SSD drive thermal readings from internal/external thermal sensors and the SSD drive thermal limitations for effective energy consumption and reliability. For performance monitoring, the module detects and tracks multiple parameters that represent the current performance state. These parameters are used for defining the energy allotment cycle time and target PCIe link speed. The host PCIe effective bandwidth is determined out of the available PCIe link speed bandwidth and how much is really used for read and write payloads. The device active and idle states determine the SSD energy efficiency by measuring the active energy consumption periods and idle energy depleted periods.

In another embodiment, in combination with a short duty cycle, there are two options. To modulate or reduce the speed interface over the PCIe interface. For example, reducing the link speed from Gen5 to Gen4. Reducing the link speed to effectively half of the speed. To modulate is to define an active phase and an inactive phase for a window of time. For example, within the 10 millisecond window the interface is running over L0, which is the active link state of PCIe and at another phase the system 500 is driving the link into L1 and L1 is an inactive phase. The difference between the two strategies is that while pushing the link into an inactive state, there are a lot of low power methods that are reducing the System-on-a-Chip (SoC) power. This is cutting clocks and shutting down Phase-locked loops (PLLs), there could even be a drop in the voltage a little bit because the system 500 is idle.

Furthermore, most of the CPUs will be either in idle or be clock gated. A lot of the design is going to lay dormant in that the PCIe link is pushed into L1. An additional short duty cycle strategy is to balance the workload while utilizing both strategies in parallel. If a host lends nicely to a duty cycle strategy and there are other hosts that do not or at least workloads that do not, the one host that lends well will do cycle strategy in parallel which is a more effective manner. Given that the host is able to queue up commands parallelizing a lot of tasks is allocated to the NAND. Therefore, balancing out a lot of commands creates an opportunity to parallelize and push towards duty cycle versus a trickle of commands coming out from the host that do not pose the opportunity to parallelize.

Figure 6:
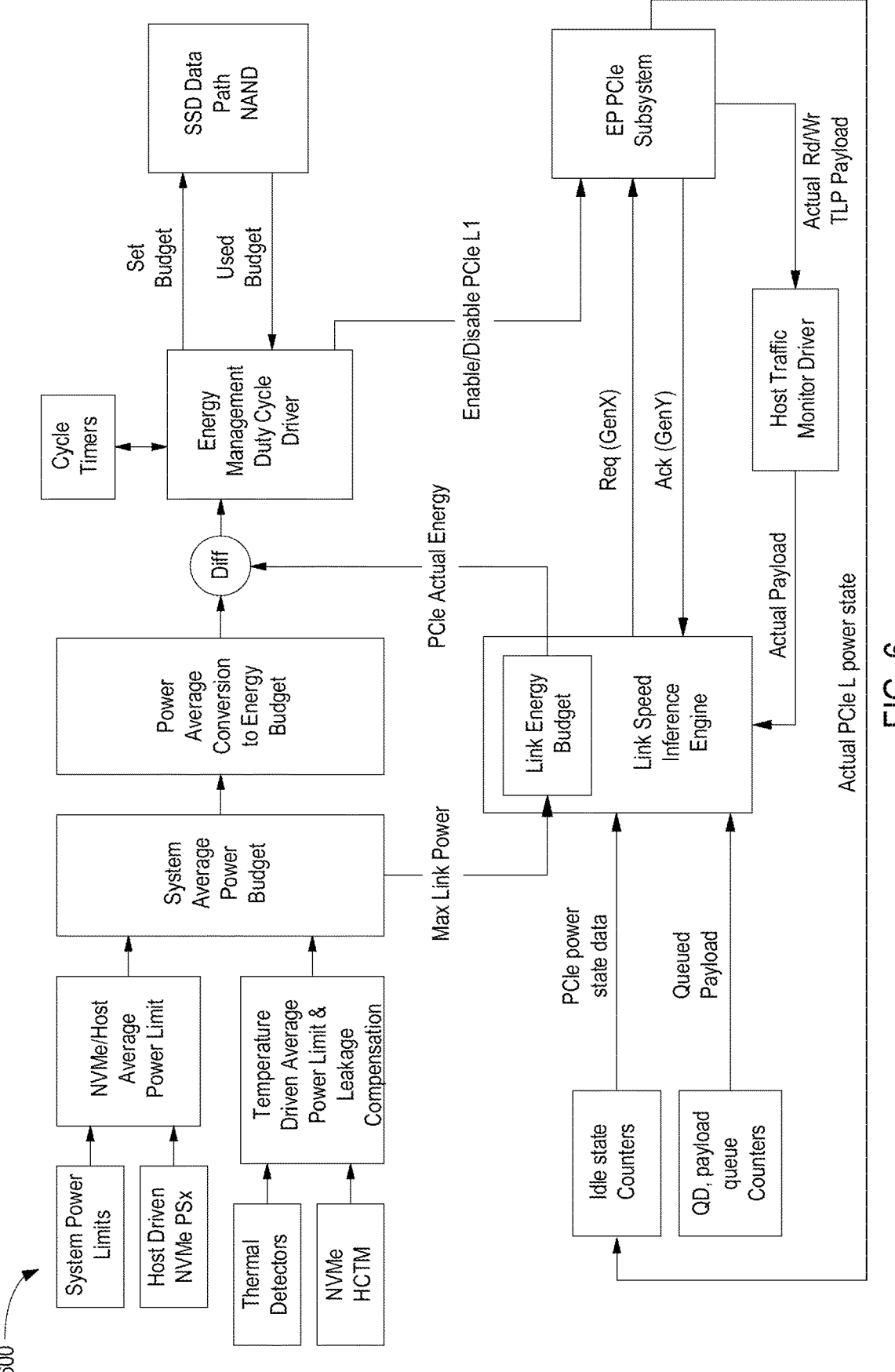
FIG. 6 is a block diagram illustrating a system for hybrid PCIe link state, according to certain embodiments.

FIG. 6 is a block diagram illustrating a system 600 for hybrid PCIe link state, according to certain embodiments. The system 600 comprises an energy management duty cycle driver that runs energy management, duty cycle. The energy management duty cycle driver decides how to do the duty cycle stuff. The system 600 further comprises a link speed inference engine. The energy management duty cycle driver and the link speed inference engine are combined in the sense there is an energy management that drives both duty cycle and the link speed. The link speed inference engine is able to decide whether to reduce the link speed. If the link speed inference engine decides to reduce the link speed or increase the link speed, then link speed inference engine will consume a certain energy budget. The consumption of the energy budget will factored into the amount of energy budget that is overall available for the energy management duty cycle driver. There is a linkage between the link speed inference engine and the energy management due to cycle driver. The decisions do not have to be in any specific order. The inference engine and the energy management might take a decision together for the scope of generalization.

The system power limits has a set of settings that defines how much power the system 600 is allowed to consume. The NVMe/host average power limit produces a static number telling the system 600 for a specific customer what the limit is. There is also a temperature driven average power limit and leakage compensation that adjusts to the power limits. For example the limit could be 5 Watts. If temperature increases, then that average power of 5 Watts has to decrease in order for the system 600 to be able to cool down. Eventually these two inputs are calculated in the block which is called a system average power budget which defines the system 600 of what power is allowed to be consumed.

The system average power budget has some affinity to the link energy budget, which defines what the maximum link power is. The power limitation is converted to an energy budget number. The average power number is shifted to the energy budget number. This is a linear conversion determines how much energy the system 600 can allocate for a specific window of time that the energy management duty cycle is able to work with. A host traffic monitor driver tracks the amount of traffic that is currently running in the system 600, which is a feedback from the endpoint (EP) PCIe subsystem. On the opposite side on the host traffic monitor driver has an estimate of how much payload or how much work is upcoming.

The queued payload monitors the commands that are currently in the system 600. The queue payload provides accurate information of what bandwidth was consumed in the past, whether one millisecond in the past or 100 milliseconds in the past the amount of time can vary. The system 600 is able to keep track of the history of the usage of the EP PCIe subsystem. Furthermore, the system 600 can predict based on the currently queued payload what's going to be the traffic for the system 600 in the next millisecond or so.

The link speed inference engine receives all these numbers or data including the max link power that is allocated from the system average power budget and eventually outputs value for the EP PCIe subsystem to go to a certain Gen speed. The system average power can allocate a Gen speed or a Gen width. Both the speed of the PCIe or the amount of lanes that the PCIe would use can be modulated. The EP PCIe subsystem will acknowledge whether the system 600 can comply with the value or not. The compliance to the value is pending the agreement of the host. So the EP PCIe has two factors in this interface, the host root complex system and the EP PCIe subsystem. The system 600 will ask the host to go to a higher Gen speed. The host may not want to and the system 600 believes that the bandwidth is increasing, but in actuality no increase occurs.

The system 600 thought that the bandwidth was increasing, but the bandwidth doesn't increase and the acknowledgement or the reply from the subsystem might be different from what is asked for. The link speed inference engine accounts for that. The engine takes into account the amount of energy or the amount of power that is being consumed by the actual PCI link speed and link width. The computation is taken into account in order for the system 600 to understand how much power is available for the system 600 after the deducted PCI and point energy.

Figure 7:
FIG. 7 is a flowchart illustrating a method for modulating the memory device, according to certain embodiments.
Figure 7:
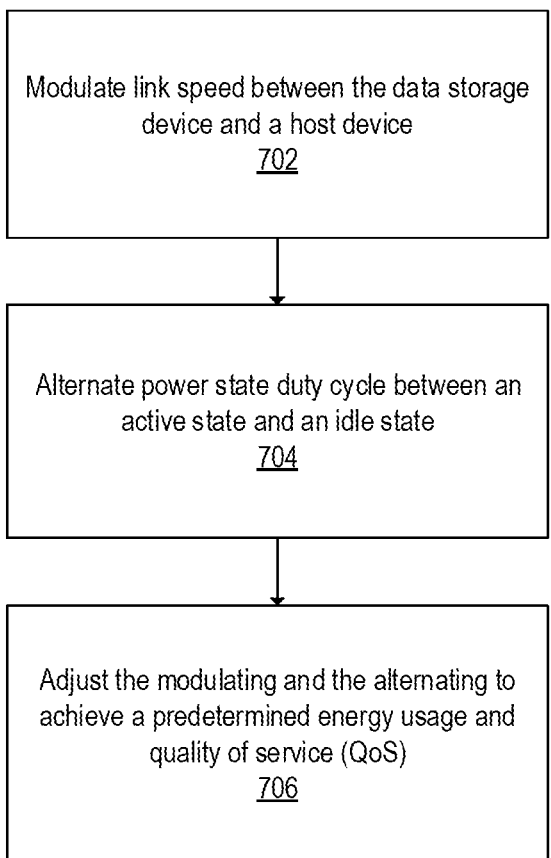

FIG. 7 is a flowchart illustrating a method 700 for modulating the memory device, according to certain embodiments. The method 700 begins at block 702. At block 702, the memory device modulates link speed between the data storage device and a host device. At block 704, the memory device alternates power state duty cycle between an active state and an idle state. At block 706, the memory device adjusts the modulating and the alternating to achieve a predetermined energy usage and Quality of Service (QOS).

Figure 8:
FIG. 8 is a flowchart illustrating a method for calculating duty cycle and active state, according to certain embodiments.
Figure 8:
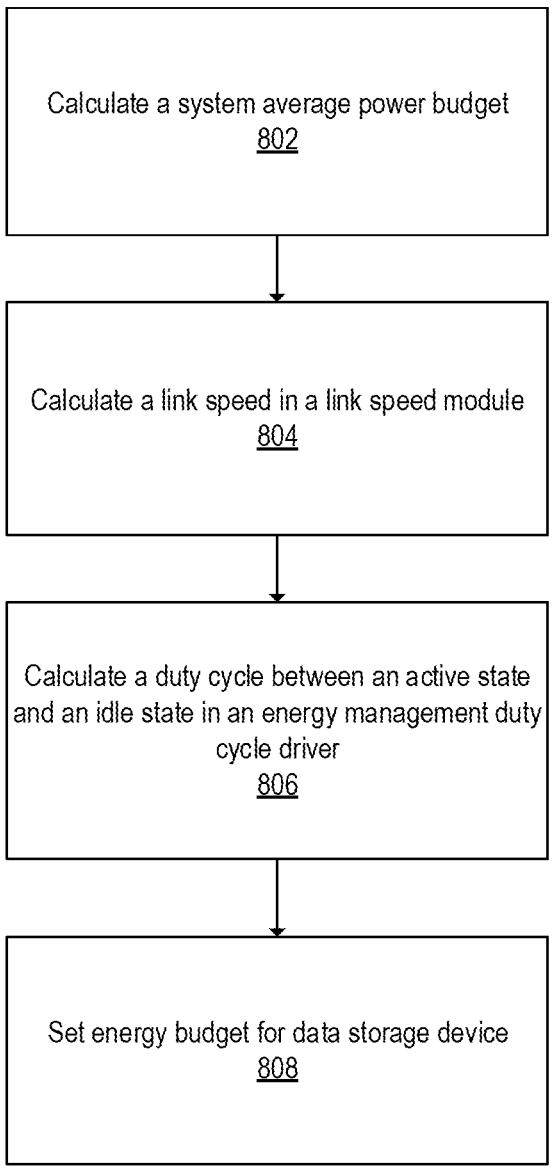

FIG. 8 is a flowchart illustrating a method 800 for calculating duty cycle and active state, according to certain embodiments. The method 800 begins at block 802. At block 802, the memory device calculates a system average power budget. At block 804, the memory device calculates a link speed in a link speed module. At block 806, the memory device calculates a duty cycle between an active state and an idle state in an energy management duty cycle driver. At block 808, the memory device sets energy budget for data storage device.

Figure 9:
FIG. 9 is a flowchart illustrating a method for adjusting power state, according to certain embodiments.
Figure 9:
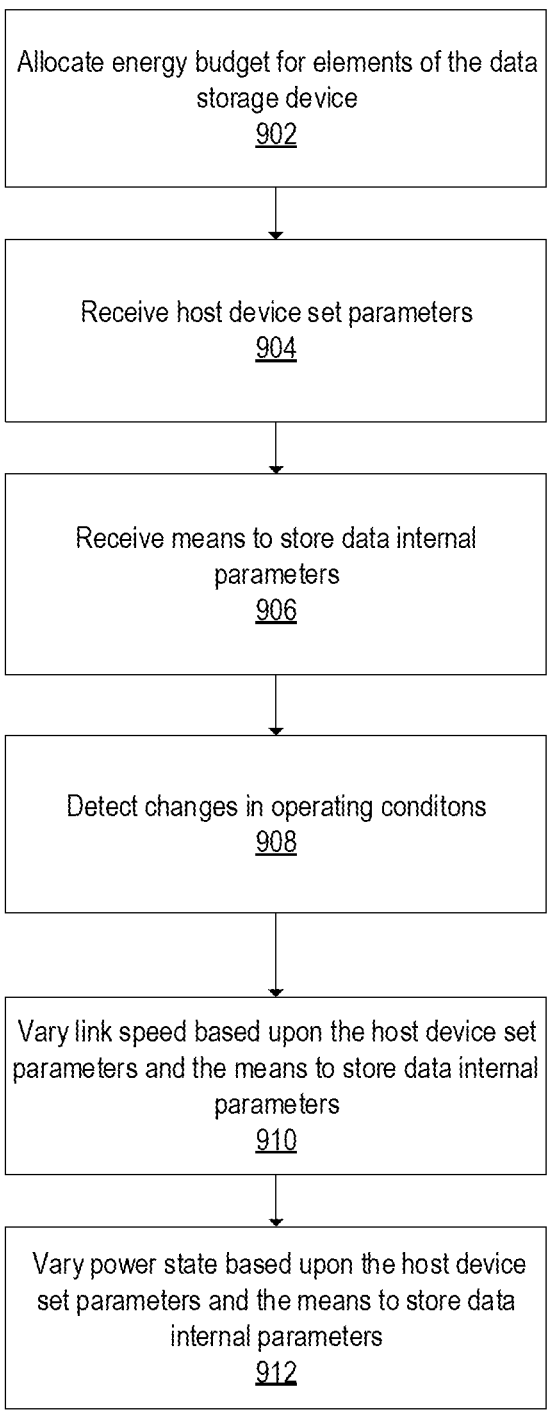

FIG. 9 is a flowchart illustrating a method 900 for adjusting power state, according to certain embodiments. The method 900 begins at block 902. At block 902, the controller allocates energy budget for elements of the data storage device. At block 904, the controller receives host device set parameters. At block 906, the controller receives internal parameters. At block 908, the controller detects changes in operating conditions. At block 910, the controller varies link speed based upon the host device set parameters and the means to store data internal parameters. At block 912, the controller varies power state based upon the host device set parameters and the means to store data internal parameters.

By combining the PCIe link speed modulation and PCIe link power state strategies, the hybrid approach maximizes system efficiency.

In one embodiment, a data storage device comprises: a memory device, and a controller coupled to the memory device, wherein the memory device is configured to: modulate link speed between the data storage device and a host device; alternate power state duty cycle between an active state and an idle state; and adjusting the modulating and the alternating to achieve a predetermined energy usage and quality of service (QOS). The modulating and alternating occur in parallel. The controller comprises a link speed inference engine. The controller further comprises an energy management duty cycle driver. The controller is configured to increase or decrease the link speed. The increase or decrease is in response to changing data storage device conditions. The controller is configured to maintain the predetermined energy usage based upon the adjusting. The controller is configured to maintain the QoS based upon the adjusting. The controller is configured to receive an indication of a predetermined amount of power that can be consumed. The adjusting is in response to thermal measurements.

In another embodiment, a data storage device comprises: a memory device; and a controller coupled to the memory device, wherein the memory device is configured to: calculate a system average power budget; calculate a link speed in a link speed module; calculate a duty cycle between an active state and an idle state in an energy management duty cycle driver; and set energy budget for data storage device. The controller includes a host traffic monitor driver. The controller includes an energy management duty cycle driver. The controller includes a link speed interface engine, wherein the link speed interface engine has an output that feeds into the energy management duty cycle driver. The controller includes a nonvolatile memory express (NVMe) host average power unit that is configured to receive inputs of system power limits and host driven NVMe power states. The controller includes a temperature driven average power limit and leakage compensation module that is configured to receive inputs of thermal detectors. The controller includes a system average power budget module that is configured to receive an input from the NVMe host average power unit and the temperature driven average power limit and leakage compensation module.

In another embodiment, a data storage device comprises: means to store data; and a controller coupled to the means to store data, wherein the controller is configured to: allocate energy budget for elements of the data storage device; receive host device set parameters; receive means to store data internal parameters; detect changes in operating conditions; vary link speed based upon the host device set parameters and the means to store data internal parameters; and vary power state based upon the host device set parameters and the means to store data internal parameters. The controller is configured to convert a power limitation received from a host device to an energy number. The controller is configured to calculate an amount of energy that can be used in a specific window of time.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
modulate link speed between the data storage device and a host device;
alternate power state duty cycle between an active state and an idle state; and
adjusting the modulating and the alternating to achieve a predetermined energy usage and quality of service (QoS), wherein the modulating and alternating occur in parallel.

2. The data storage device of claim 1, wherein the controller comprises a link speed inference engine.

3. The data storage device of claim 2, wherein the controller further comprises an energy management duty cycle driver.

4. The data storage device of claim 1, wherein the controller is configured to increase or decrease the link speed.

5. The data storage device of claim 4, wherein the increase or decrease is in response to changing data storage device conditions.

6. The data storage device of claim 5, wherein the controller is configured to maintain the predetermined energy usage based upon the adjusting.

7. The data storage device of claim 5, wherein the controller is configured to maintain the QoS based upon the adjusting.

8. The data storage device of claim 1, wherein the controller is configured to receive an indication of a predetermined amount of power that can be consumed.

9. The data storage device of claim 1, wherein the adjusting is in response to thermal measurements.

10. A data storage device, comprising:
means to store data; and
a controller coupled to the means to store data, wherein the controller is configured to:
allocate energy budget for elements of the data storage device;
receive host device set parameters;
receive and store data internal parameters;
detect changes in operating conditions;
vary link speed based upon the host device set parameters and the stored data internal parameters; and
vary power state based upon the host device set parameters and the stored data internal parameters.

11. The data storage device of claim 10, wherein the controller is configured to convert a power limitation received from a host device to an energy number.

12. The data storage device of claim 11, wherein the controller is configured to calculate an amount of energy that can be used in a specific window of time.

* * * * *